United States Patent [19]

Willibald

[11] 4,417,627
[45] Nov. 29, 1983

[54] APPARATUS FOR BREAKING ROCK LOCATED IN A FIELD

[76] Inventor: Josef Willibald, D-7771 Frickingen 2 (Altheim), Fed. Rep. of Germany

[21] Appl. No.: 312,830

[22] Filed: Oct. 19, 1981

[30] Foreign Application Priority Data

Oct. 20, 1980 [DE] Fed. Rep. of Germany ....... 3039553

[51] Int. Cl.³ ............................................ A01B 43/00
[52] U.S. Cl. ...................................... 172/45; 171/64; 172/47; 172/96; 241/101.7; 241/189 R
[58] Field of Search ....................... 172/45, 47, 52, 96; 171/63, 64; 241/185, 189 R, 101.7

[56] References Cited

U.S. PATENT DOCUMENTS

| | | | |
|---|---|---|---|
| 1,044,441 | 11/1912 | Buchanan | 241/189 R |
| 1,157,670 | 10/1915 | Boswell | 172/96 |
| 2,450,492 | 10/1948 | Stevenson | 241/189 R X |
| 2,751,830 | 6/1956 | Stauffer | 171/63 X |
| 2,751,831 | 6/1956 | Null | 172/96 X |
| 2,972,384 | 2/1961 | Thome | 171/63 |
| 3,530,946 | 9/1970 | Major | 172/96 |
| 3,952,811 | 4/1976 | Carre | 172/45 |

FOREIGN PATENT DOCUMENTS

| | | | |
|---|---|---|---|
| 958712 | 2/1957 | Fed. Rep. of Germany | 241/185 |
| 2826191 | 12/1979 | Fed. Rep. of Germany | 171/63 |
| 341852 | 12/1959 | Switzerland | 172/45 |
| 498316 | 1/1936 | United Kingdom | 172/45 |
| 779118 | 7/1957 | United Kingdom | 241/185 R |
| 442829 | 5/1975 | U.S.S.R. | 241/189 R |

Primary Examiner—Paul E. Shapiro
Attorney, Agent, or Firm—Toren, McGeady and Stanger

[57] ABSTRACT

Apparatus for breaking rock found in soil, such as in a field used for farming, includes a hood-like housing. A work shaft and a drum are positioned under the hood with the work shaft preceding the drum in the normal direction of movement of the apparatus. Flail-like parts are located on the outer surface of the work shaft and travel along a circular path. Prongs are provided on the drum and also move around a circular path. The circular path of the prongs is located lower than the circular path of the flail-like parts and at their closest point the circular paths are approximately tangent to one another where rock or other material is transferred from the prongs to the flail-like parts.

8 Claims, 8 Drawing Figures

APPARATUS FOR BREAKING ROCK LOCATED IN A FIELD

SUMMARY OF THE INVENTION

The present invention is directed to a mechanical apparatus, either self-propelled or drawn by a tractor, used for continuously breaking rock of various kind, sizes and quantities located in the surface region of soil, such as just below the surface of a field used for farming. In agriculture, particularly in the deep loosening of arable soils, in the cultivation of fields covered with live or dead plant material, and also in the machine harvesting of crops, the working parts extending into the soil are vulnerable to damage especially if the soil is stony. Usually damage occurs by driving the working parts against larger pieces of rock or by driving the rock into the apparatus. Picking up the rock is not practical, because there is a constant or additional supply which works itself up out of the deeper layers of the soil. In the past, attempts have been made to break up larger pieces of rock into harmless smaller pieces using so-called mulching devices which had been appropriately strengthened mechanically and structurally. It has become evident, however, while the basic concept is possible, the available apparatus requires a special construction to achieve the desired end.

Therefore, it is the primary object of the present invention to provide an apparatus based on the principle of the mulching device disclosed in West German Pat. No. 24 32 739 which is suitable for picking up and breaking even larger pieces of rock.

In accordance with the present invention, a rotatably driven drum, mounting rigid or movable prongs or teeth is arranged behind a rotatable work shaft which supports the breaking or mulching flail-like parts, that is, the drum is located rearwardly of the work shaft in the direction of movement of the apparatus over a field. The prongs on the drum move in a circular path which is located below the circular path described by the flail-like parts. At their closest point the paths of both of these parts are approximately tangent to one another and form the area of material transfer where rock or other material picked up by the prongs is transferred to the flail-like parts.

The major advantage of the present invention, in addition to the mechanical breaking up of even larger pieces of rock located in the upper layers of the soil into approximately walnut-shaped pieces, is the simultaneous yield of a mealy stone-mulch which is known for its ability to improve the condition of the soil.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
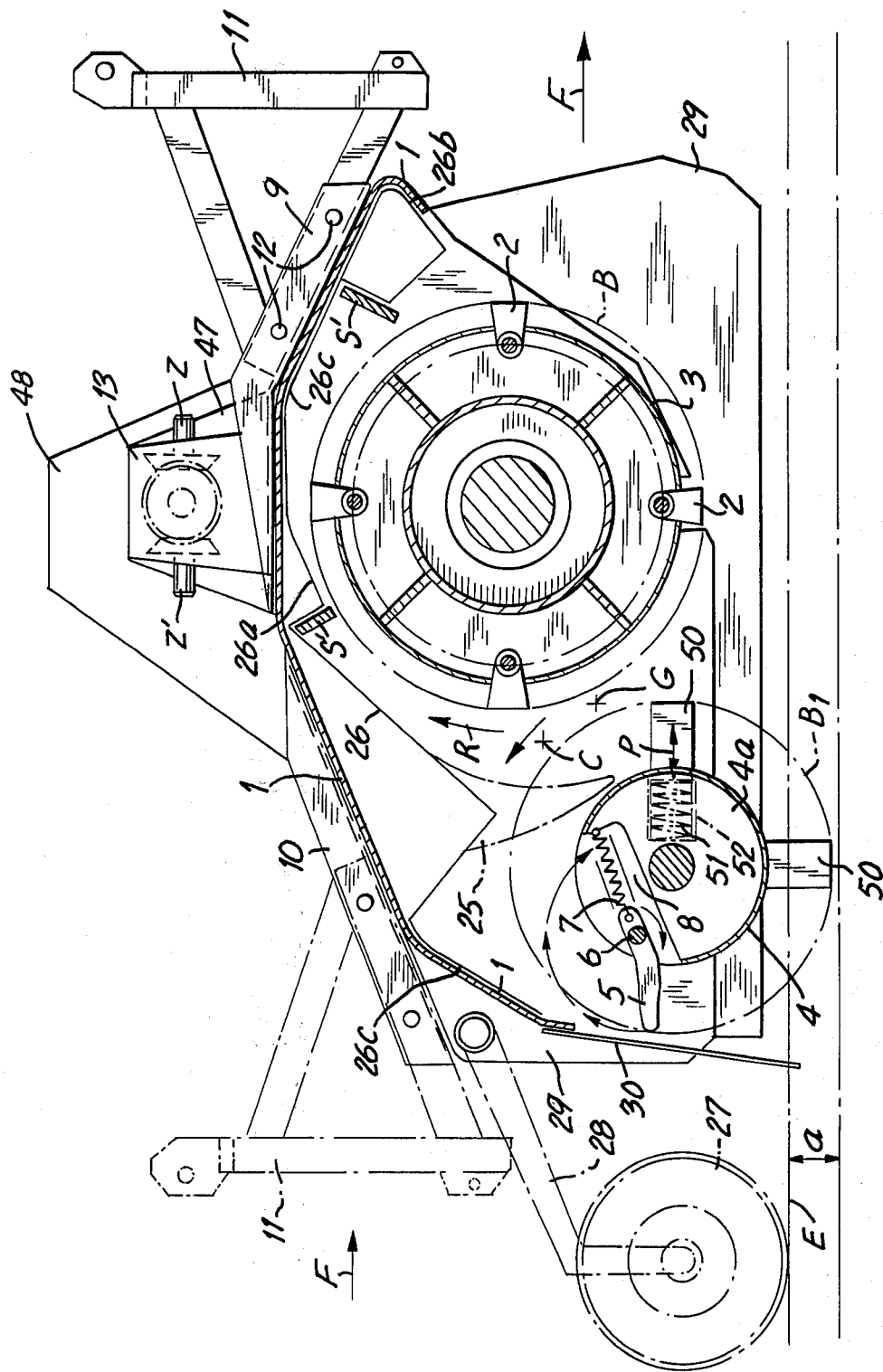
FIG. 1 is a side view, partly in section, of an apparatus embodying the present invention.
Figure 2:
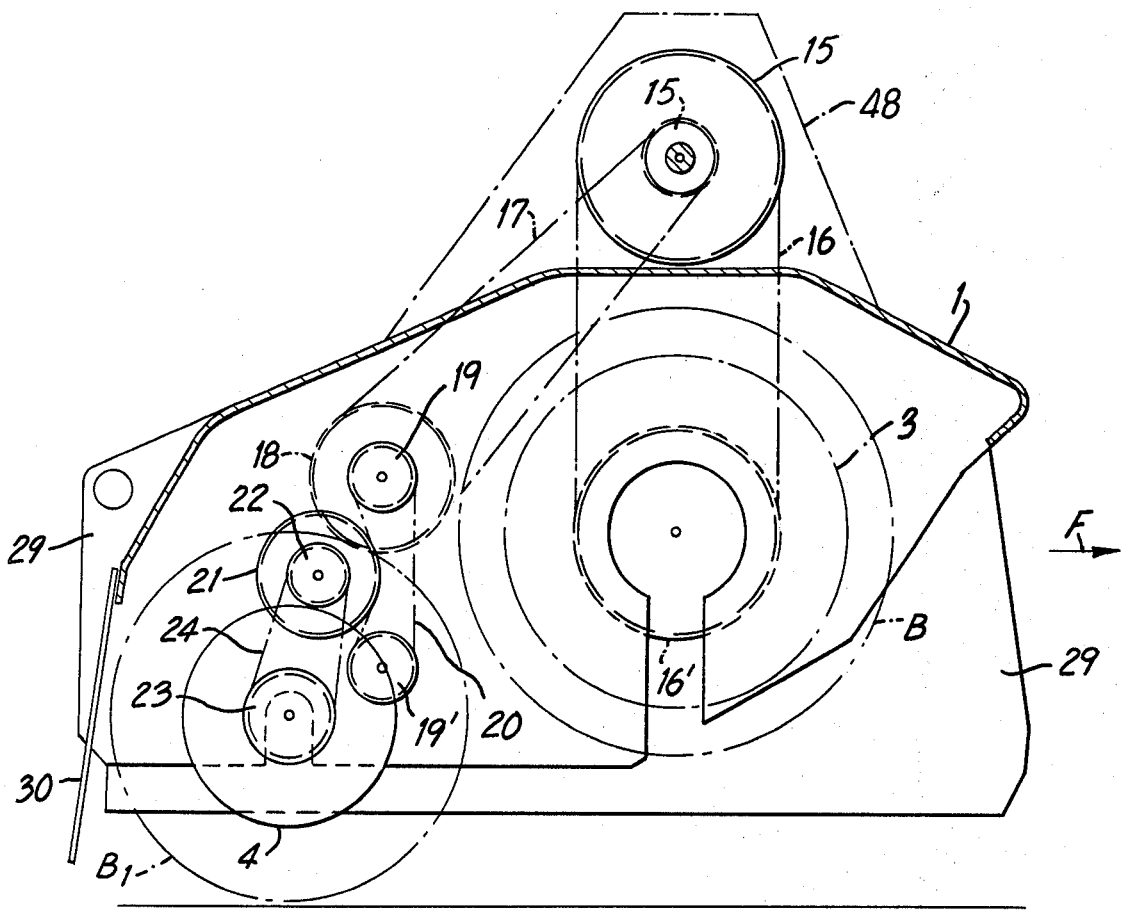
FIG. 2 is a schematic side view of the drive for the apparatus shown in FIG. 1.

In the drawing the apparatus embodying the present invention includes a hood-like housing 1 extending in the direction F, the direction of movement of the apparatus over a field. Mounted under the housing 1 is a work shaft 3 mounting a plurality of breaking or mulching flail-like parts 2. Behind the work shaft 3 in the direction of its movement F, is a drum 4 also located under the hood-like housing. At least one row of prongs 5 extend across the peripheral circumference of the drum transversely of the direction of movement F. Both the work shaft 3 and the drum 4 are rotatably mounted.

In accordance with the present invention, prongs 5 have a lever-like shape and are articulated on the drum, adjacent the outside surface thereof, by a fulcrum or pivot 6. Each prong is held in position on the drum by a spring 7. The pivotal mounting of the prongs 5 and the arrangement of the springs 7 afford the possibility that the prongs can be folded back in the direction opposite to the direction of rotation R of the drum, into recesses 8 formed in the interior 4a of the drum when a prong contacts an obstacle it is incapable of displacing. While a single form of pivotal displacement of the lever-like prong 5 is shown other types of pivotal displacement for moving the prongs into the drum interior 4a is possible within the scope of the present invention.

Figure 3:
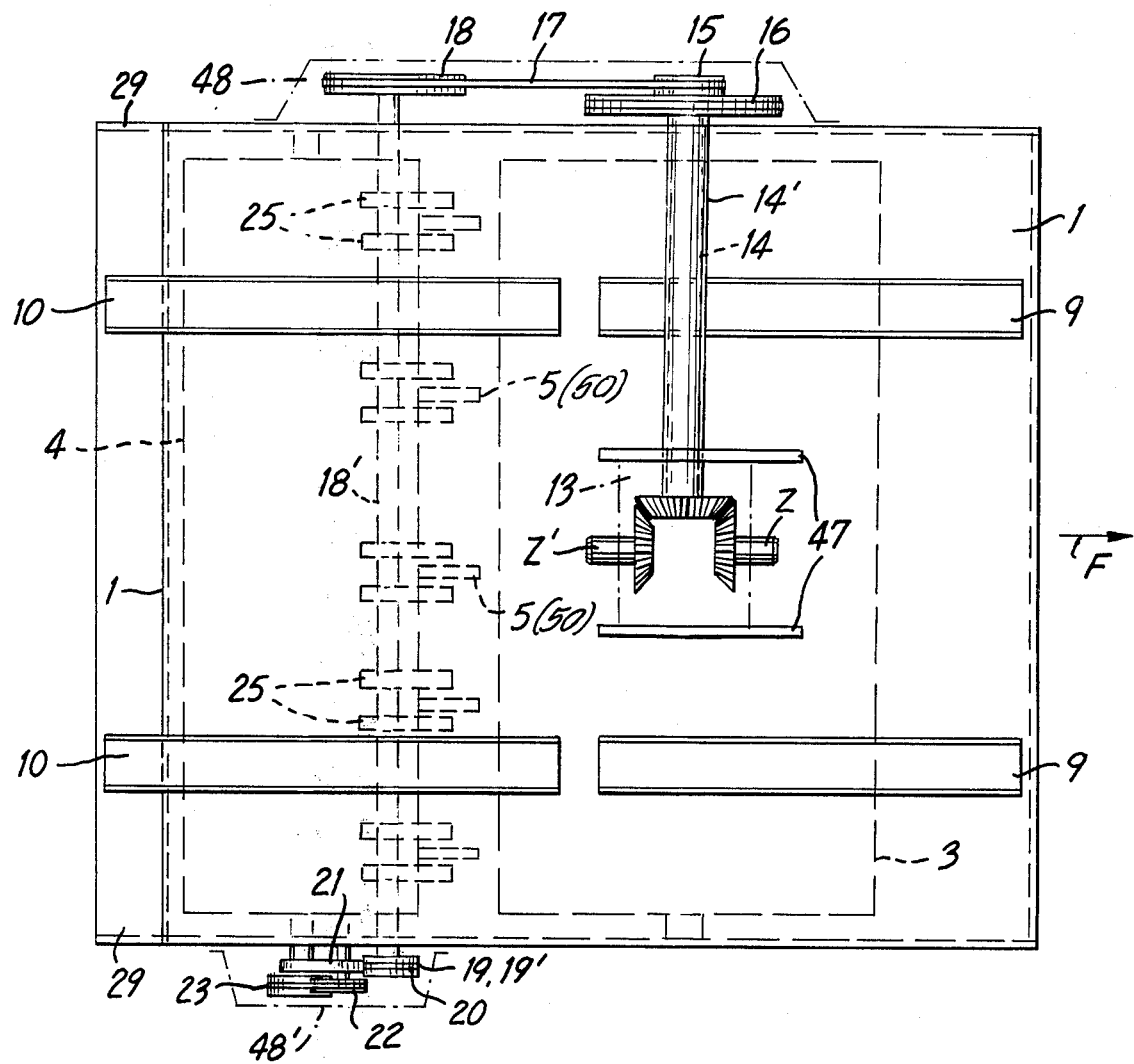
FIG. 3 is a top view of the schematic plan shown in FIG. 2.

Members 9 and 10 are mounted on the top side of the housing 1 with the mounting 9 on its forward end and the mounting 10 at its rearward end. It is possible, by means of these mountings, to secure a three-point mounting frame 11 by means of cotter pins 12 either to the forward or rearward end of the apparatus. The location of the attachment of the mounting frame 11 depends on whether the apparatus is secured to the front end or the rear end of an appropriate tractor. As can be seen in FIG. 1 an angular input gear assembly 13 is mounted on top of the housing 1 and includes two power take-off stub shafts Z, Z', one extending forwardly and the other extending rearwardly. These stub shafts Z, Z' afford connection of the apparatus to a conventional universal power take-off shaft of a tractor drive unit. As shown in FIG. 3, a horizontal shaft 14 extends outwardly from one side of the gear assembly 13 to a side gear unit 15 located along one side of the hood-like housing 1. A belt drive or chain drive 16 extends from the side gear unit 15 down to the work shaft 3, while another belt drive or chain drive 17 extends from the side gear unit to an intermediate drive 18 on the same side of the housing. Another horizontal shaft 18' extending parallel with and spaced rearwardly from the shaft 14 extends from the intermediate drive to the opposite side of the housing 1. An additional side gear unit made up of discs 19, 19' are located on the opposite side of the housing and via belt 20 effect the reversal of the rotating direction by an intermediate disc 21 which drives the drive wheels 22, 23 by a belt connection 24 for the drum 4. In place of the gear assembly arrangement described above, it is also possible to provide a separate drive, such as a hydraulic motor, for the drum 4. Especially effective work results are achieved with this apparatus when the circular path $B_1$ of the prongs 5 on the drum 4 are located below the circular path B of the flail-like parts 2 on the work shaft 3. The circular paths $B_1$ and B refer to the path described by the radially outer ends of the prongs 5 and the flail-like parts 2. As can be seen in FIG. 1, at their closest point, the circular paths are approximately tangent to one another and describe between them an area of material transfer G where the rock or other material picked up by the prongs 5 on the drum 4 are transferred to the flail-like parts 2 on the work shaft 3. Further, a scraping grate 25 extends downwardly from the housing 1 into the circular path $B_1$ of the prongs 5. The scraping grate 25 is shaped like a comb or rake and is connected tangentially to the adjacent surface of the shaped reinforcement member 26 on the surface of the housing 1 above the work shaft and the drum. The grate 25 assures that material picked up by the prongs 5 is transferred to the mulching or breaking flail-like parts 2 and is not conveyed rearwardly in the direction of rotation R of the drum. Further, the grate affords the advantageous effect that the material picked up is held in the area C between the circular paths B, $B_1$ and the surface of the member 26. As the material is constantly kept in movement it undergoes a preliminary breaking before it contacts the actual impacts battens or bars $S_1$ mounted on the shaped parts 26a, 26b of the member 26. These impact bars S' are formed of a high strength, tough material similar to that used for the flail-like parts 2.

Finally, the apparatus is completed by the trailing wheels 27 mounted on the rear end of the housing 1. Supporting arms 28 mount the trailing wheels 27 on lateral housing plates 29. Further, flexible and movable impact protection elements are secured to and extend downwardly from the rear end of the housing 1 behind the drum 4. It is also possible to shape the supporting arms 28 so that the wheels 27 can be secured onto the mounting 10. The reinforcement member 26 and its parts 26a, 26b and 26c extend between the lateral sides of the hood-like housing 1 between the lateral housing plates 29 and provide a torsionally rigid, static support system. The angular gear assembly 13 is held by bearing plates 47 on the top side of the hood-like housing 1 and the horizontal shaft 14 is supported in a sheathing tube 14', and the side gear units 15, 19 are covered by hoods 48, 48', respectively.

Another possible form of the drum 4 is also shown in FIG. 1 with one or more rows of rigid prongs 50 spaced angularly apart and staggered relative to one another in the rotation of direction of the drum. These rigid prongs 50 are mounted so that, if overloading occurs, or if they strike against a particularly heavy obstruction, they move radially inwardly into pockets 52 formed in the interior of the drum with the movement being indicated in the direction P of the double-headed arrow shown in FIG. 1. A spring 52 is located within the pocket and biases the prong 50 into its normal working position outwardly from the outer surface of the drum 4. While the prongs 5 are especially constructed to pick up material from the ground or soil E, the prongs 50 extend into the ground for a certain depth a and lift out of this region of the soil interlocked roots, stones and the like and carry them upwardly to the flail-like parts 2. Accordingly in the present invention, the flail-like parts 2 on the work shaft 3 are always located above ground level E, preferably without any contact with the ground, so that the work shaft 3 constantly retains its full flywheel effect without being braked by contact with the ground, and consequently its drive energy is maintained.

At the same time, with such an apparatus, there is the demand for an extremely compact work shaft with a high flywheel mass with the working tools or parts articulated to it so that when the tools encounter strong obstacles they can withdraw into the outer surface of the shaft to avoid damage to the apparatus as a whole which would occur through overloading and the like. Such a work shaft embodying this feature is shown in FIGS. 4 and 5 and the work tools or flail-like parts are shown in detail in FIGS. 6, 7 and 8.

Figure 4:
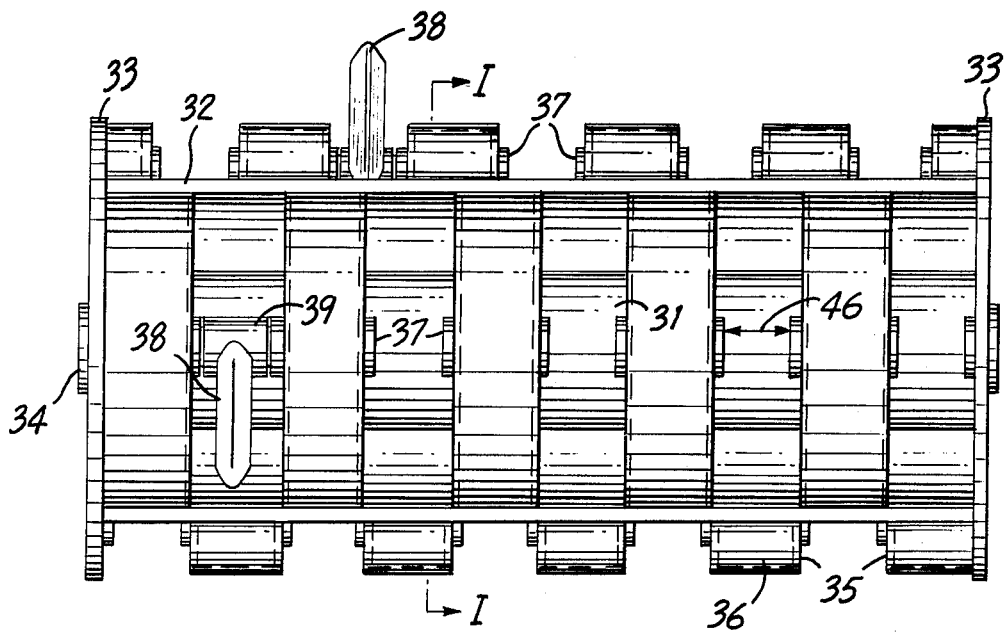
FIG. 4 is an elevational view of a work shaft utilized in the apparatus of the present invention.
Figure 6:
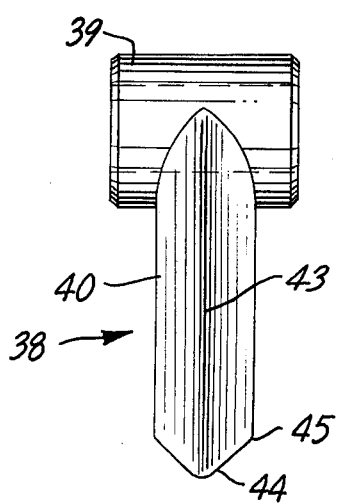
FIGS. 6, 7 and 8 are a side view, a top view and front view, respectively, of a flail-like part used in the present invention.
Figure 5:
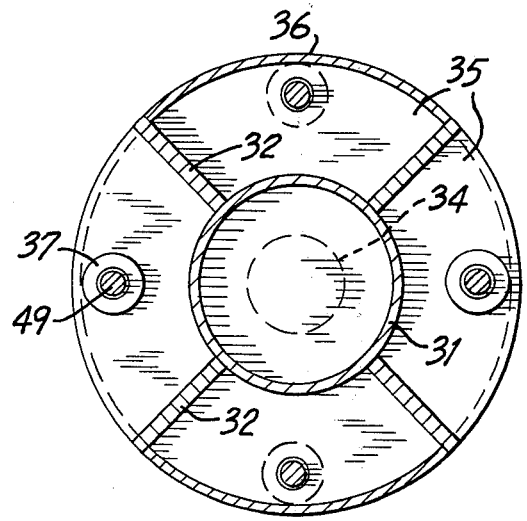
FIG. 5 is a sectional view taken along the line I—I in FIG. 4.
Figure 7:
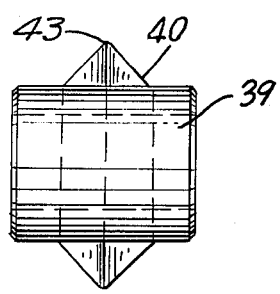
Figure 8:
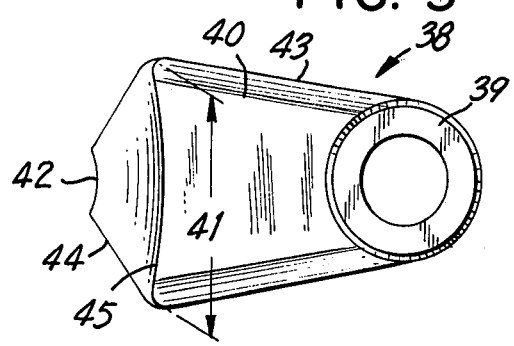

As shown in FIGS. 4 and 5 the work shaft 2 includes a central tube 31 with bars 32 secured to the outside surface of the tube and extending radially outwardly to the outside surface of the work shaft. A pair of end plates 33 define the opposite ends of the work shaft with each supporting a bearing journal 34. Pockets are formed in the work shaft between the bars 32 and are disposed in staggered arrangement relative to one another in the rotational direction of the shaft. The pockets are formed by at least one side part 35 and by an arcuate covering plate 36 extending along the circumferential periphery of the overall work shaft. In the side parts 35 there are bearings 37 on which the work tools 38 are mounted. These bearings include, as shown in FIGS. 6, 7 and 8, a bearing body 39. A flail-like part 40 is secured to and extends outwardly from the bearing body 39 in a generally radial direction relative to the axis of the work shaft. Each flail-like part 40 diverges in width outwardly from the bearing body 39 to a location adjacent its outer free end where the flail-like part then converges inwardly forming its shaped cutting edge. As a result, the flail-like part has a width dimension 41 greater than the width dimension of the cutting edge 42 located at the radially outer free end of the part. As can be seen in FIG. 8, the flail-like part has a generally trapezoidal shape. The opposite edges 43 of the flail-like part extending radially outwardly from the bearing body 39 are chamfered or tapered outwardly. Cutting edges 44 extend from the radially outer end of the edges 43 to the radially outer edge 42. At its maximum width 41 the flail-like part has a concave surface 45 facing outwardly. From the surface 45 the outer end of the flail-like part tapers inwardly to the point formed by the edge 42 so that a good breaking effect is achieved. The work tools 38 are supported so as to oscillate in the free space 46, note FIG. 1, within the lateral surfaces defining a pocket, or between one lateral surface and end plate 33. The flail-like parts or work tools 38 can swing freely through the space 46. Independent axles 49 extend through and support the bearing body or hubs 39 and serve to mount the work tools 38. To be able to adapt this apparatus to particular rock conditions in a soil, or to provide flail-like parts which provide more of a cutting than a breaking effect, such as where the apparatus is used as a forest mulching device for cutting up branches, it is possible to arrange the apparatus so that the distance between the axes of the work shaft 3 and the drum 4 is adjustable. At the outer circumferential surface of the work shaft, the work tools or flail-like parts 2 are arranged along a spiral or helical line in a single row or in multiple rows disposed opposite one another and staggered 180°. Further, the hammer-like flail-like parts are provided with a hard metal layer on impact edges to reduce wear and tear.

While specific embodiments of the invention have been shown and described in detail to illustrate the application of the inventive principles, it will be understood that the invention may be embodied otherwise without departing from such principles.

I claim:

1. Apparatus for breaking rock found in soil such as in a field used for farming or for cutting sub-surface obstructions in the field, comprising a hood-like housing having a forward end and a rearward end relative to the direction of movement of the apparatus over a field, a work shaft rotatably mounted under said hood and the axis of said work shaft extending transversely of the direction of movement of the apparatus, said work shaft is divided into hollow pocket-like sections with the radially outer circumferential surface of said pocket-like sections being closed, flail-like parts mounted on and extending radially outwardly from the radially outer circumferential surface of said work shaft and spaced across the axial direction thereof and disposed offset to one another around the circumference of said work shaft, each said flail-like part is mounted in one said pocket-like section within said work shaft and extends generally radially outwardly from the closed radially outer circumferential periphery of said pocket-like section, a drum located under said hood-like housing and mounted for rotation about an axis extending in generally parallel relation with the axis of said work shaft and having a circumferential periphery extending around the axis of rotation thereof, said drum is spaced rearwardly from said work shaft relative to the direction of movement of the apparatus, prongs mounted on and extending outwardly from the circumferential periphery of said drum, said prongs travel in a circular path around the axis of said drum and the radially outer edge of said circular path is located lower than the outer edge of the circular path of said flail-like parts rotating about the axis of said work shaft, and the outer edges of the circular paths of said prongs and said flail-like parts are approximately tangent to one another at the closest point therebetween where material is transferred from said prong to said flail-like parts.

2. Apparatus, as set forth in claim 1, including means for pivotally mounting said prongs on said drum so that said prongs can be pivotally displaced inwardly of the circumferential periphery of said drum upon experiencing obstacles.

3. Apparatus, as set forth in claim 2, wherein said means includes recesses formed in the surface of said drum, a pivot member located within said recess, said prong comprising a lever-like part pivotally mounted on said pivot, and a spring secured to said prong and to said drum for holding said prong in the radially outwardly extending working position.

4. Apparatus, as set forth in claims 1, 2 or 3, wherein said prongs extend in at least one row extending in the axial direction of said drum and said prongs being staggered in relation to one another around the circumferential surface of said drum.

5. Apparatus, as set forth in claim 4, wherein said prongs being retractable inwardly of the outer circumferential surface of said drum.

6. Apparatus, as set forth in claim 1, including means for driving said work shaft and said drum, said means arranged to drive said drum reduced in its number of revolutions relative to said shaft.

7. Apparatus, as set forth in claim 1, wherein said hood-like housing comprising a shaped reinforcement member extending across the side surface of said housing above said work shaft and said drum, said member including shaped reinforcement parts, said parts extending across said housing in the axial direction of said work shaft and said drum, impact bars supported on said reinforcement parts and extending across said housing in the axial direction of said work shaft and drum, said impact bars disposed generally radially relative to and spaced closely outwardly from the outer edge of the circular path of said flail-like parts, a scraping member mounted on and extending downwardly from said housing into the circular path of said prongs on said drum.

8. Apparatus, as set forth in claims 1, 2 or 3, wherein said work shaft and said drum being mounted in said housing so that the spacing between the axes thereof can be varied.

* * * * *